INVENTORS
Robert H. Welker and
BY George F. Ritter, Jr.
Hobbe & Swope
ATTORNEYS

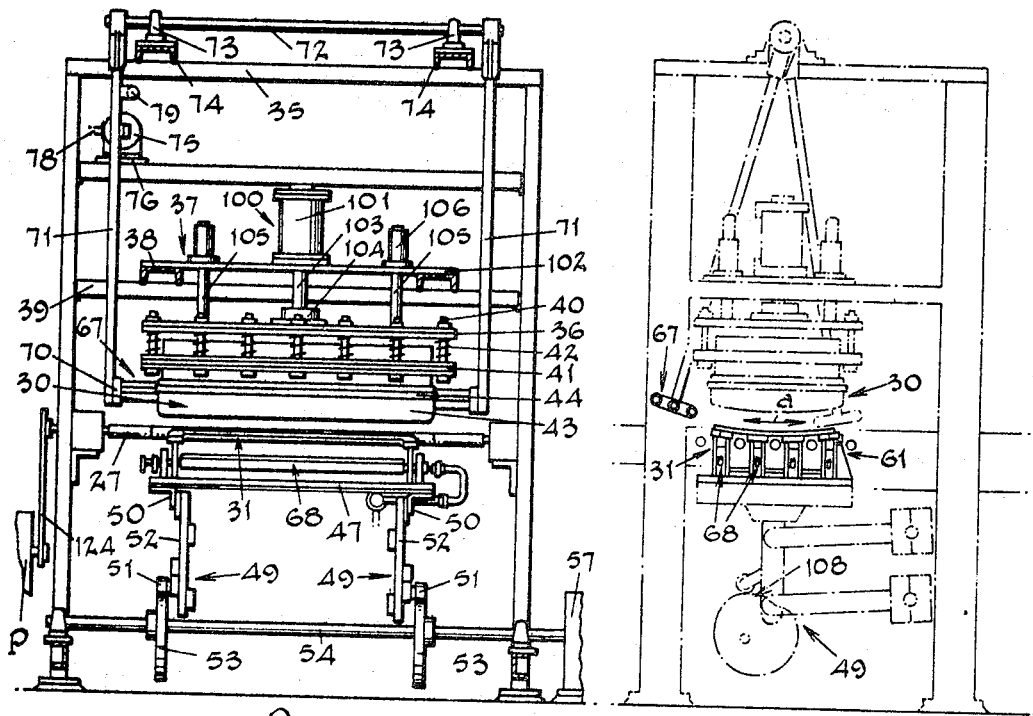

Jan. 6, 1970     R. H. WELKER ETAL     3,488,178
APPARATUS FOR RESHAPING AND COOLING GLASS SHEETS
Filed April 18, 1966     4 Sheets-Sheet 3

INVENTORS
Robert H. Welker and
BY George F. Ritter, Jr.
Hobbe & Swope
ATTORNEYS

INVENTORS
Robert H. Welker and
BY George F. Ritter, Jr.
Nobbe & Swope
ATTORNEYS

United States Patent Office 3,488,178
Patented Jan. 6, 1970

3,488,178
APPARATUS FOR RESHAPING AND COOLING GLASS SHEETS
Robert H. Welker, Perrysburg, and George F. Ritter, Jr., Toledo, Ohio, assignors to Libbey-Owens-Ford Company, Toledo, Ohio, a corporation of Ohio
Filed Apr. 18, 1966, Ser. No. 543,193
Int. Cl. C03b 23/02
U.S. Cl. 65—268
2 Claims

ABSTRACT OF THE DISCLOSURE

Apparatus for setting glass sheets to curvature after they are press bent and while they are still in contact with one of the shaping surfaces of the bending mold. Cooling air is directed against the sheet by oscillating tubes located beneath the bending mold. High pressure air is directed to the tubes and aspirating means are provided to increase the volume and reduce the pressure of the air before it strikes the sheet.

---

This invention relates generally to production of curved tempered sheets of glass and more particularly to a new and improved apparatus for heat treating glass sheets.

Curved sheets of glass are widely used as glazing closures particularly as side windows for vehicles, such as automobiles or the like. To be suitable for such applications the curved sheets must be bent to rather precise curvature dictated by the way in which they are to be mounted and by the over-all style of the vehicle. At the same time, it is important that the sheets meet rather stringent optical requirements, more particularly that the viewing area of the window be free of any optical defects which would tend to interfere with clear vision through the window.

In addition, it is necessary for the bent sheets, intended for use as glazing closures in vehicles, to be tempered to increase their resistance to damage resulting from impact. As is well known, tempering glass sheets will modify the breaking characteristics of glass whereby, if the tempered sheet should be broken, it will disintegrate into relatively small harmless particles as opposed to large, jagged, dangerous pieces resulting when ordinary untempered glass sheets are broken.

In general, the commercial production of curved tempered sheets of glass is accomplished by heating substantially flat sheets of glass to an elevated temperature at which the glass may be bent or formed to the desired curvature, pressing the heated sheets between interfitting shaping surfaces and thereafter chilling the heated bent sheets to rapidly reduce the temperature thereof and place the outer surface under compression and the interior in tension.

In the production of bent and tempered sheets in relatively large quantities, such as would be encountered in the commercial production of glazing closures of automobiles or the like, the sheets are heated, bent and tempered in a substantially continuous procedure while being moved successively, one by one, along a predetermined path through a heating area, a bending area and a tempering area. These areas are conti guous so that individual sheets upon being moved through one area pass immediately into and through the following area. By this procedure the heat imparted to the sheet to bring it to the proper bending temperature is utilized in the tempering process.

The primary object of the present invention is to provide an improved apparatus for producing curved tempered glass sheets having precisely defined curvatures and improved optical properties.

Another object is to provide improved apparatus for setting the curvature of a heated bent glass sheet immediately after being bent without producing optical defects in the finished unit.

A further object is to accomplish the foregoing by directing streams of cooling fluid toward a bent sheet while it is supported on a portion of the bending mold and reciprocating the streams relative to the surfaces of a sheet to set the bent sheet in the desired curvature.

Other objects and advantages of the invention will become more apparent during the course of the following description when read in connection with the accompanying drawings.

In the drawings, wherein like numerals are employed to designate like parts throughout the same:

FIG. 3 is an end elevational view of the bending area of FIG. 1;

FIG. 4 is a side elevational view of the bending area showing the features of the present invention with the remaining bending apparatus being shown in phantom lines;

FIG. 5 is a vertical sectional view taken along line 5—5 of FIG. 2;

FIG. 6 is a transverse vertical sectional view taken along lines 6—6 of FIG. 2;

FIG. 7 is an enlarged detailed sectional view taken along lines 7—7 of FIG. 6;

FIG. 8 is a fragmentary plan view of the member shown in FIG. 7;

Figures 1, 2:
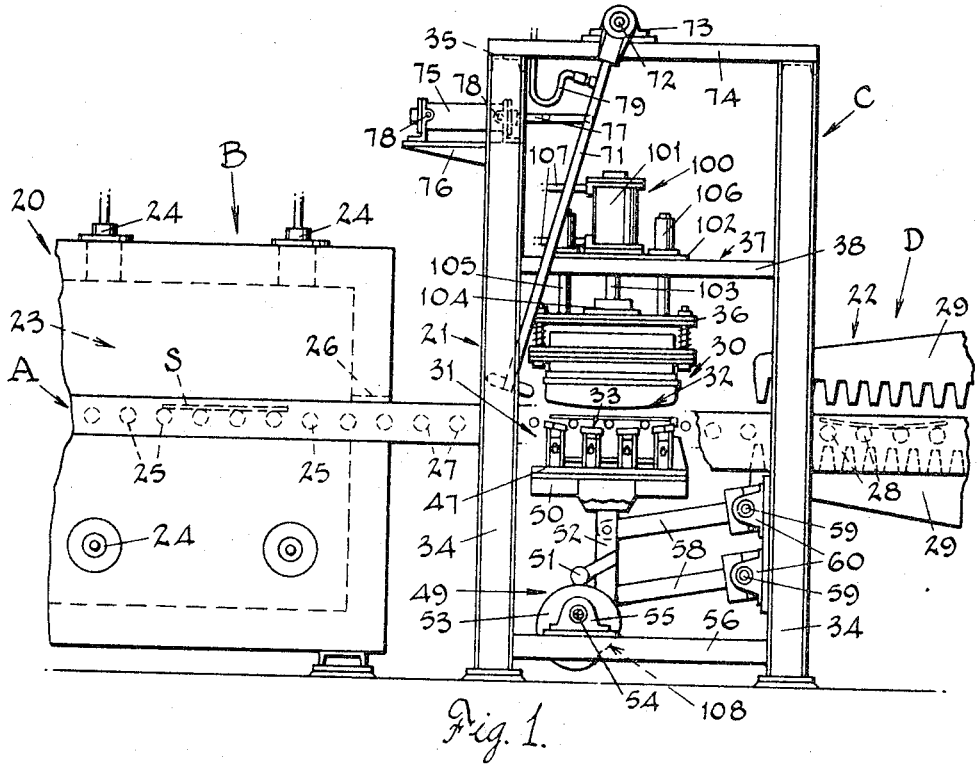
FIG. 1 is a side elevational view of a bending and tempering apparatus incorporating the features of the present invention.
FIG. 2 is a plan view of details of the bending means of FIG. 1.
Figure 9:
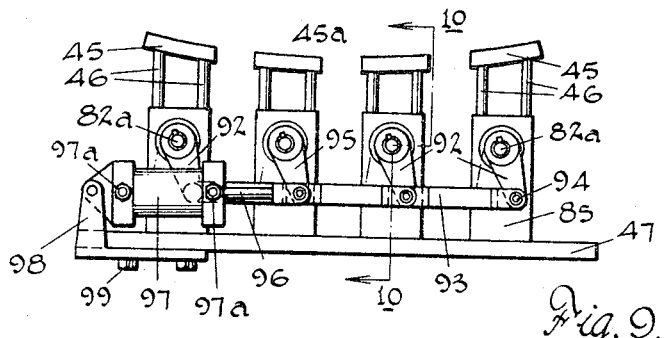
FIG. 9 is a side elevational view of the details of the bending means shown in FIG. 2.

In the drawings, for purposes of illustration, the features of the present invention are shown as incorporated into an apparatus (FIG. 1) particularly adapted for the continuous production of bent and tempered sheets of glass by a process similar to that described above. The apparatus includes a conveyor system A operable to carry glass sheets S along a predetermined substantially horizontal path through a heating area B comprising a furnace 20 for heating the sheets to the desired temperature, a bending area C having bending means 21 for forming the sheets to the desired curvature and a tempering area D having chilling means 22 for rapidly reducing the temperature of the sheets to produce the desired temper therein.

In the present instance the glass sheets S are heated in the furnace 20 which is of the tunnel type and has an elongated heating chamber 23, defined by refractory walls, which is heated by suitable burners or equivalent heating devices 24. The flat glass sheets to be heated are advanced through the heating chamber by a conveyor comprising a plurality of spaced conveyor rolls 25, which forms a part of the conveyor system A, extending from the entrance end (not shown) to an oppositely disposed exit end of the furnace. The conveyor rolls 25 are driven in unison by a power source (not shown) to move the sheets through the heating chamber where they are heated to substantially their bending temperature and, upon emerging from an opening 26 at the exit end of the furnace, are received on a second conveyor consisting of a plurality of spaced rolls 27, which is also part of the conveyor system A. The heated sheets are moved along the path by the conveyor rolls 27, driven by a power source P, into the bending area C where they are formed to the desired curvature by the bending means 21.

After being bent, the sheets continue along the path onto a third conveyor consisting of a plurality of spaced rollers 28, also a part of the conveyor system A, which are driven in common by a power source (not shown) to move the sheets through the tempering area D past the chilling means 22. In the illustrative embodiment the chilling means 22 include blast heads 29 disposed above and below the path operable to direct opposed blasts of cooling fluid, such as air, towards and against the opposed surfaces of the sheets moving along the path.

In the illustrated apparatus, the bending means 21 comprises a bending mold having mold parts 30 and 31 adapted to press the heat softened glass sheets into the desired configuration. For this purpose, complemental interfitting shaping surfaces 32 and 33 are formed on the respective faces of the mold parts 30 and 31 which are movable relative to each other and to the path to bring the shaping surfaces into pressing engagement with opposite sides of the heated sheets.

The mold parts 30 and 31 are carried by a suitable support framework which includes two upright columns 34 at each side of the path and spaced apart longitudinally along the path with the corresponding columns at opposite sides of the path being transversely aligned. The columns 34 extend above the conveyor rolls 27 and are interconnected at their upper ends with beams 35 extending horizontally above the path and secured at their opposite ends to respective columns to thereby form a rigid box-like structure with the columns.

As mentioned above, the glass sheets are shaped to the desired curvature by being pressed between the shaping surfaces 32 and 33 formed on the relatively movable mold parts 30 and 31. To this end, the mold parts are mounted for relative movement with respect to each other between an open position, wherein the mold parts are spaced apart, and a closed position wherein the shaping surfaces on the mold parts are in close proximity to each other and operable to press a glass sheet therebetween.

While either or both of the mold parts may be moved to press the sheet between the complemental shaping surface, in the present instance the upper mold part 30 remains substantially stationary and the lower mold part 31 is mounted to reciprocate back and forth in a vertical plane toward and away from the upper mold part. In this manner, as a heated sheet is carried by the conveyor rolls 27 into the bending area C and between the mold parts it is raised by the lower mold part 31 into pressing engagement with the upper mold part to form the sheet to the desired shape after which it is returned to the conveyor rolls and moved into the tempering area D.

As shown in FIGS. 1 and 3, the upper mold part 30 is supported above the path by a mounting frame 36 supported on mounting means 37 carried by beams 38 extending longitudinally along the path and supported at their opposite ends on transversely extending beams 39 which are secured to the columns 34. The upper mold part 30 is supported on the mounting frame 36 (FIG. 3) by bolts 40 passing through a flange 41 formed integrally with and projecting horizontally outwardly from the upper mold part and through openings on the mounting frame 36. The mold part 30 is held in spaced relation to the mounting frame by resilient means, such as coil springs 42, telescoped on the bolts and acting between the opposed surfaces of the flange 41 on the mold part and the lower surfaces of the mounting frame 36. The coil springs serve to permit yielding of the upper mold part to prevent excessive pressure from being exerted on the glass sheets as te lower mold part 31 is moved into pressing engagement therewith. Furthermore, the shaping surface of the mold 30 may be adjusted relative to the plane of the path by tightening or loosening the nuts on the bolts to thereby compress or relieve the springs.

The mold parts may be of any construction and formed of a variety of materials capable of withstanding the rather high temperature to which the mold is subjected.

Herein, the upper mold part 30 comprises a cup-shaped structure, formed of metal or plaster, having a generally convex surface formed on the downwardly directed face thereof which forms a continuous shaping surface 32. Therefore, the entire upper surface of the sheets will be engaged by the shaping surface of the mold part to insure that the inner areas of the sheets will be formed precisely to the desired curvature.

This, of course, means that the upper surfaces lying within the viewing areas of the finished window are likely to be marred as a result of the contact. In order to avoid marring the glass sheets and to better enable the upper or male mold part 30 to withstand the high temperatures to which it is subjected, the shaping surface may be covered with a heat resistant, nonabrasive material 43, such as glass cloth, held in place by a band 44 encircling the mold part.

The lower mold part 31 is an open ring type structure which engages only the marginal portions of the sheet to avoid maring those portions of the undersurface of the sheet which lie within the viewing area of the finished window. For this purpose, the lower of female mold part 31 is formed by bars 45, preferably made of metal or similar material able to withstand the high temperatures to which the mold is subjected. The bars 45 are illustratively shown in FIG. 2 as arranged in a rectangular quadrangle conforming in plan to the outline of the glass sheets and having the shaping surface 33 formed on their upwardly directed sides to conform in elevation to the curvature of the sheets when bent. The bars are held in position by rods 46 upstanding from a base 47.

Ordinary metallic materials have a tendency to fuse to glass when the latter is heated to the elevated temperature necessary for bending which will produce defects in the finished window. To avoid this, the sheet contacting surface of the mold part or more particularly the upper surfaces of the bars are provided with a cover 48 of refractory material which will not fuse to the heated sheets.

In order that the female mold part may move between the conveyor rolls 27 between the open and closed positions, the longitudinally extending sides or bars of the ring are divided into short segments 45a arranged end-to-end with their adjacent ends spaced apart a sufficient distance so that the segments may pass between adjacent rollers 27.

The mold parts are illustratively shown as being substantially rectangular in outline with the longitudinal sides of the rectangle extending transversely of the path of movement of the sheets. However, it will be appreciated that the particular outline of the mold parts is dictated by the outline shape of the glass sheets to be bent and any desired outline may be utilized. In fact, if desired, two sets of mold parts may be located in the bending area and spaced transversely of the path so that a pair of glass sheets may be simultaneously bent.

As was stated above, the lower mold part 31 is mounted for relative movement with respect to the path from a position below the plane of the path to a position above the plane of the path wherein the shaping surface of the mold parts are disposed in close proximity to each other. Raising and lowering of the lower or female mold part toward and away from the male or upper mold part is accomplished by any suitable actuating mechanism coupled to the lower mold part. While a variety of different types of mechanisms may be employed to impart the desired reciprocal motion, a simple cam and follower mechanism 49 is illustratively shown. Herein, two such actuating mechanisms are provided which are transversely spaced along the path and are connected at the opposite sides of the base 47 by angle irons 50. However, since the mechanisms are identical in construction, a detailed description of one will be sufficient for the present purposes.

The actuating mechanism 49 (FIG. 1) includes a cam follower 51, secured to a bar 52 connected to one leg of the angle iron 50 depending from the lower surface of the base 47. The cam follower is adapted to ride on the outer periphery of the disc cam 53 shaped to impart the desired sequence of motion to the carriage and lower mold part. The cam is rigidly secured to a shaft 54 extending transversely of the path below the lower mold part with opposite ends of the shaft journaled in bearings 55 mounted on beams 56 extending longitudinally of the path and secured to the columns 34. One end of the shaft projects outwardly beyond the framework and is connected to a driving means 57 (FIG. 3) which is operable to rotate the shaft about a fixed horizontal axis.

The carriage and the lower mold part are guided for vertical movement by a pair of spaced elongated members 58 extending between the bar and the column 34 with one end of each of the elongated members pivotally secured to the bar and the opposite end attached to shafts 59 extending between the transversely aligned columns 34. The shafts are journaled adjacent their opposite ends in bearings 60 carried by the colums 34. In this manner, the bar, columns and the elongated members form a four bar linkage with the bar 52 and the vertically disposed columns 34 forming one pair of bars of the linkage while the spaced elongated members 58 form the second pair of bars of the linkage.

In order to insure that the respective sheets are properly located relative to the shaping surfaces, locating devices 61 (FIGS. 2 and 6) are disposed adjacent one edge of the mold parts and are spaced transversely of the path with a portion thereof adapted to be moved into and out of the path and be engaged by the leading edge of the moving sheet. The locating devices 61 (FIG. 6), in the illustrative embodiment, each include a fluid cylinder 62 supported on the base of the lower mold part with each having a rod 63 having an enlarged piston 64 slidably received in the cylinder. The upper end of the rod is provided with an enlarged portion or stop 65 which is movable into and out of the path of the moving sheet. When fluid pressure is applied to the lower end of the cylinder through conduits 66 from a source of pressure (not shown), the stops 65 will be raised and moved into the path of the moving sheet and, when the source of pressure is relieved, the stops are moved below the path of the sheet by gravity acting upon the enlarged weighted pistons.

The operation of the continuous bending and tempering apparatus can readily be appreciated by reference to FIG. 1. Flat glass sheets S are loaded onto the conveyor rolls 25 at the entrance end (not shown) of the furnace and moved through the heating chamber 23 wherein the sheets are heated to their bending temperature. Each heated sheet passes through the opening 26 and is received on the conveyor rolls 27 to be moved into the bending area between the bending means 21. The sheet is accurately located between the complemental shaping surfaces 32 and 33 by having the leading edge engage the stops 65 located in the path of the moving sheet. The shaft 54 is then rotated to lift the sheet off the conveyor rolls into pressing engagement between the complemental shaping surfaces to be bent to the desired curvature and to thereafter return the bent sheet to the conveyor rolls 27 to be moved from the bending area onto the conveyor rolls 28 of the tempering area wherein the sheets are rapidly reduced in temperature to produce the desired temper therein.

As can readily be appreciated, in the bending process outlined above, the sheets are still in a heated condition when they are returned to the conveyor to be moved from the bending area into and through the tempering area. Therefore, the sheets which are in a somewhat softened condition, have a tendency to sag towards the conveyor to thereby lose their precisely defined curvature. Furthermore, when the heated sheets are returned to the conveyor there is a great tendency for the somewhat softened sheet to acquire defects on the surface thereof due to marring or other imperfections as the sheet is received on the conveyor rolls and moved from the bending area to the tempering area.

To alleviate these problems, the present invention contemplates slightly cooling the sheets, while being supported on the curved shaping surface of the lower mold part, to reduce their temperature to a point below where the glass takes a set, thereby rendering the sheet more rigid. To this end, immediately after the sheets are pressed between the complemental shaping surfaces, streams of cooling gases are directed across the supported surface of the sheet to thereby slightly cool the sheets and reduce its temperature whereby the glass sets rendering the sheet more rigid.

As is known in the art, when localized streams of cooling gases are applied towards the surface of the glass to impinge thereon, the areas contacted by the streams of cooling gases will be rapidly reduced in temperature to thereby cause non-uniform and undesirable stresses in these areas. Of course any non-uniform stress along the surface of the glass sheet may result in optical distortion in the glass sheet after it has passed through the tempering area and is cooled to room temperature. To eliminate these objections and produce a curve and tempered glass sheet having improved optical qualities, the present invention contemplates moving the streams of cooling gases directed towards the supported surface of the glass sheet so that the entire surface will be swept by the streams of cooling gases resulting in a more uniform stress pattern in the finished unit. Thus, the invention contemplates directing streams of cooling gases, such as air, towards the supported surfaces of the glass sheets, while the latter are being supported on a shaping surface, and reciprocating the streams relative to the surface to thereby provide a uniform cooling across the entire surface of the sheet. Furthermore, in its illustrative embodiment, the invention also contemplates cooling the unsupported surface of the sheet while the sheet is resting on the shaping surface.

To these ends, the bending cycle of the continuous bending and tempering process outlined above is controlled so that after each sheet is bent, the mold parts are separated to some extent and while the sheet is carried by the shaping surface of the lower mold part, means, disposed on opposite sides of sheet, subject the surfaces thereof to moving streams of cooling gases before they are returned to the conveyor to be moved along the path into the conveyor and into and through the tempering section.

Herein, this means comprises tubular members disposed adjacent the surfaces to be cooled with orifices formed in the members opening towards the sheet. Pressurized cooling gases are supplied to the tubular members to flow in streams through the orifices and impinge on the surfaces of the sheet with means provided for reciprocating the streams relative to the surfaces of the sheet to thereby sweep the surfaces with the cooling gases.

As best shown in FIGS. 4 to 8, the cooling means include tubular members 67 and 68 disposed on opposite sides of the sheets with orifices 69 (FIGS. 8 and 12) formed in the tubular members to direct streams of air towards the surfaces of the sheet. In the illustrative embodiment of the invention, the tubular members 67 for cooling the upper surface of the bent heated sheet are normally disposed in an out-of-way position at one side of the upper mold part 30 and mounted to be moved across the upper surface of the glass sheet.

Figure 10:
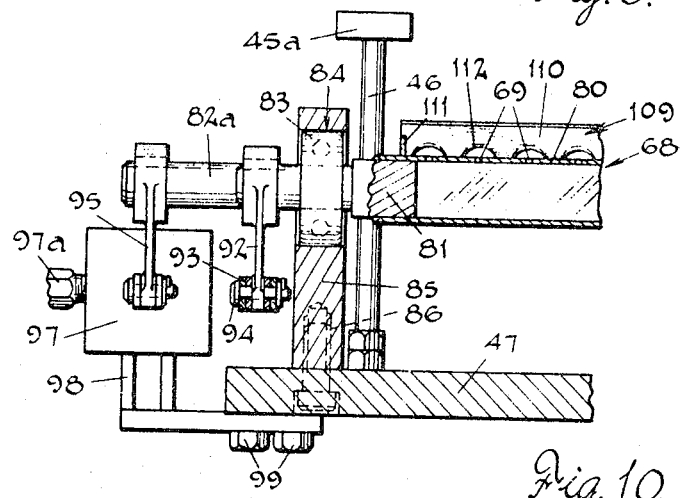
FIGS. 10 and 11 are enlarged fragmentary vertical sectional views of opposite sides of the bending means taken along lines 10—10 of FIG. 9.
Figure 11:
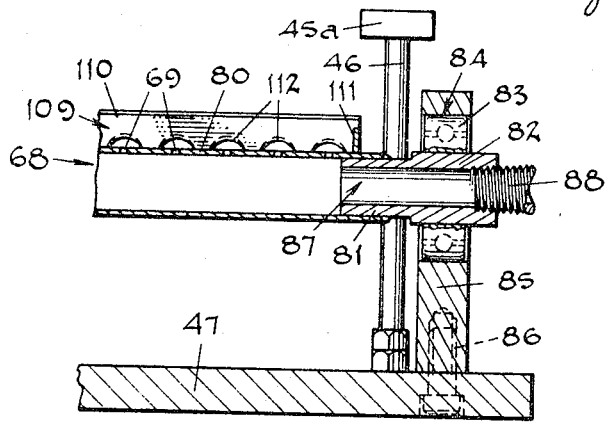

The tubular members 68 for cooling the lower surface of the glass sheet are supported on the lower mold part. In the illustrative embodiment these lower tubular members are rectangular in cross sectional configuration, as shown in FIG. 7, with the openings 69 formed in the top wall 80 thereof. The opposite ends of the rectanagular tubular members are enclosed by adaptors 81 (FIGS. 10 and 11) having integral shafts 82 extending outwardly therefrom. The shafts 82 are journaled in bearings 83 received in openings 84 of brackets 85 supported above the base of the lower mold part and secured thereto by threaded devices 86.

The adaptors and shafts on one end of the tubular members are provided with axial bores 87 which are internally threaded at their outer ends and threadedly receive a coupling 88 therein. The coupling in turn is connected to a manifold 89 (FIG. 6) by suitable flexible tubing 90 and pipe unions 91. The shafts located on the opposite ends of the tubular members extend beyond the brackets and are each provided with a crank 92. The free ends of the cranks are interconnected by a coupling bar 93 pivotally secured at each of the free ends of the crank extensions by suitable securing devices 94.

Means are provided for oscillating the lower tubular members about the shafts 82. For this purpose, one of the shafts is provided with a further extension 82a (FIGS. 2 and 10) which extends beyond its associated crank and is provided with a coupling member 95 having its free end connected to a reversible actuator. Herein, the reversible actuator is illustratively shown as a fluid cylinder and piston rod with the free end of the piston rod 96, which is slidably received in a fluid cylinder 97, connected to the coupling member. The fluid cylinder in turn is pivotally supported on a bracket 98 extending beyond the longitudinal side edge of the lower mold part and secured thereto by bolts 99. Therefore, by alternately providing fluid pressure respectively to the opposite ends of the fluid cylinder through conduits 97a, the tubular members may be rocked back and forth about the fixed shafts, oscillating the streams passing through the orifices back and forth across the surface of the sheet to thereby sweep the surface of the cooling fluid. By way of example, the effective length of the stroke of the piston rod and the coupling member may be selected to be capable of rotating the streams through an arc of approximately 45°.

Separation of the mold parts for cooling the opposite surfaces in the bending area may be accomplished in a variety of different ways. By way of example, the upper mold part may be moved after the sheet has been pressed between the complemental shaping surfaces while the lower mold part is stopped in its raised position; the lower mold may be temporarily halted during its downward movement; or both of the mold parts may be moved to separate the shaping surfaces after the sheets are bent for the cooling operation.

Herein, the separation is accomplished by moving the upper mold part and temporarily halting the lower mold part above the path of the moving sheet. In the illustrative embodiment, the moving means (FIGS. 1 and 3) for raising and lowering the upper mold part is included in the mounting means 37, which has been referred to above and includes a fluid cylinder 101 supported on a base plate 102 carried by the beams 38 with a piston rod 103 slidably received in the cylinder having its free end connected to the mounting frame 37 at 104. The mounting frame and upper mold part 30 are guided for vertical movement by rods 105 projecting above the upper surface of the mounting frame and slidably received guide members 106 carried by the base plate 102. Therefore, raising and lowering the upper mold part may be accomplished by supplying fluid pressure to the appropriate ends of the fluid cylinder through conduits 107.

The travel of the lower mold part may be interrupted in several different ways; for example, the rotation of the cam shaft 54 of the actuating mechanism could be temporarily halted. In the present instances, however, for purposes of simplicity, a portion of the generated surface of the cam 53 is flattened, as at 108, to provide a dwell period during which there is no movement of the lower mold part. This dwell period may be produced at the upper limit of travel or during the downward travel of the lower mold part so long as the interruption occurs before the bent sheet is returned to the conveyor rolls 27.

In operation, after the sheets are bent by being pressed between the shaping surfaces, the upper mold part is raised, and while the sheets are carried by the shaping surface of the lower mold part, the movement of the lower mold part is interrupted. During the interruption, pressurized air is introduced into the tubular members 67 and 68 and the arms carrying the upper tubular members 67 are swung from one side of the upper mold part to the opposite side and returned along the arcuate path indicated by the arrows a in FIG. 4 to sweep the upper surface of the sheet with the air while the lower tubular members 68 are oscillated to have the streams of air emanating therefrom sweep the lower surface of the sheet.

As is well known in the art, the degree of cooling depends to a large extent upon the volume of low pressure cooling gases capable of being supplied to the surface of the sheet thereby absorbing heat from the glass and carrying this heat away from the sheet. However, as can readily be appreciated, the area adjacent the bending mold, particularly the lower mold part, has very limited space for locating the cooling means.

To facilitate supplying large quantities of cooling fluid adjacent the surface in the limited space available adjacent the shaping surface of the lower mold part, the present invention also contemplates increasing the volume of cooling gases impinging on the lower surface of the sheets by directing streams of these gases from a high pressure supply source in such a manner as to create an area of negative pressure adjacent the streams of cooling fluid flowing towards the lower surface of the sheet to thereby draw atmospheric gases into the streams which will increase the volume of the cooling gases impinging on the surface of the sheet.

Herein, this is accomplished by providing aspirating means 109 (FIGS. 7 and 8) carried by each of the tubular members adjacent the orifices so that the streams of cooling gases flowing therethrough create areas of negative pressure adjacent the streams resulting in additional ambient gases being drawn into the streams and impinging on the sheet surface to be cooled. The aspirating means 109 of the present invention include elongated hoods or nozzles formed by inclining side walls 110 and end walls 111 rigidly secured at the top wall 80 of the tubular member and the side walls are provided with openings 112 adjacent the lower portion thereof.

With particular reference to FIGS. 7 and 8, it can be seen that the inclined side walls form an elongated narrow passageway 113 terminating in an elongated narrow slot 114 adjacent the lower surface of the glass sheet, with the slot communicating with the orifices 69 and with the openings 112 in the lower portion of the inclined side walls. By directing relatively high pressure air through the orifices and the slot, areas of negative pressure are created in the passageway adjacent the orifices which will draw ambient gases surrounding the hood through the openings in the inclined side walls along the path, indicated by the arrows b. This arrangement considerably increases the volume of gases or air delivered to the glass surface and at the same time limits the size of the equipment required to deliver large amounts of gases to the surface of the glass sheet.

In order to insure that the temperature of the heated sheets will not decrease below that necessary for proper tempering, after the slightly cooled sheet is returned to the conveyor, it is desirable to have the sheets carried from the bending area by the conveyor rolls at a higher rate of speed when compared to the rate of speed at which the sheets move through the furnace.

Figures 12, 13:
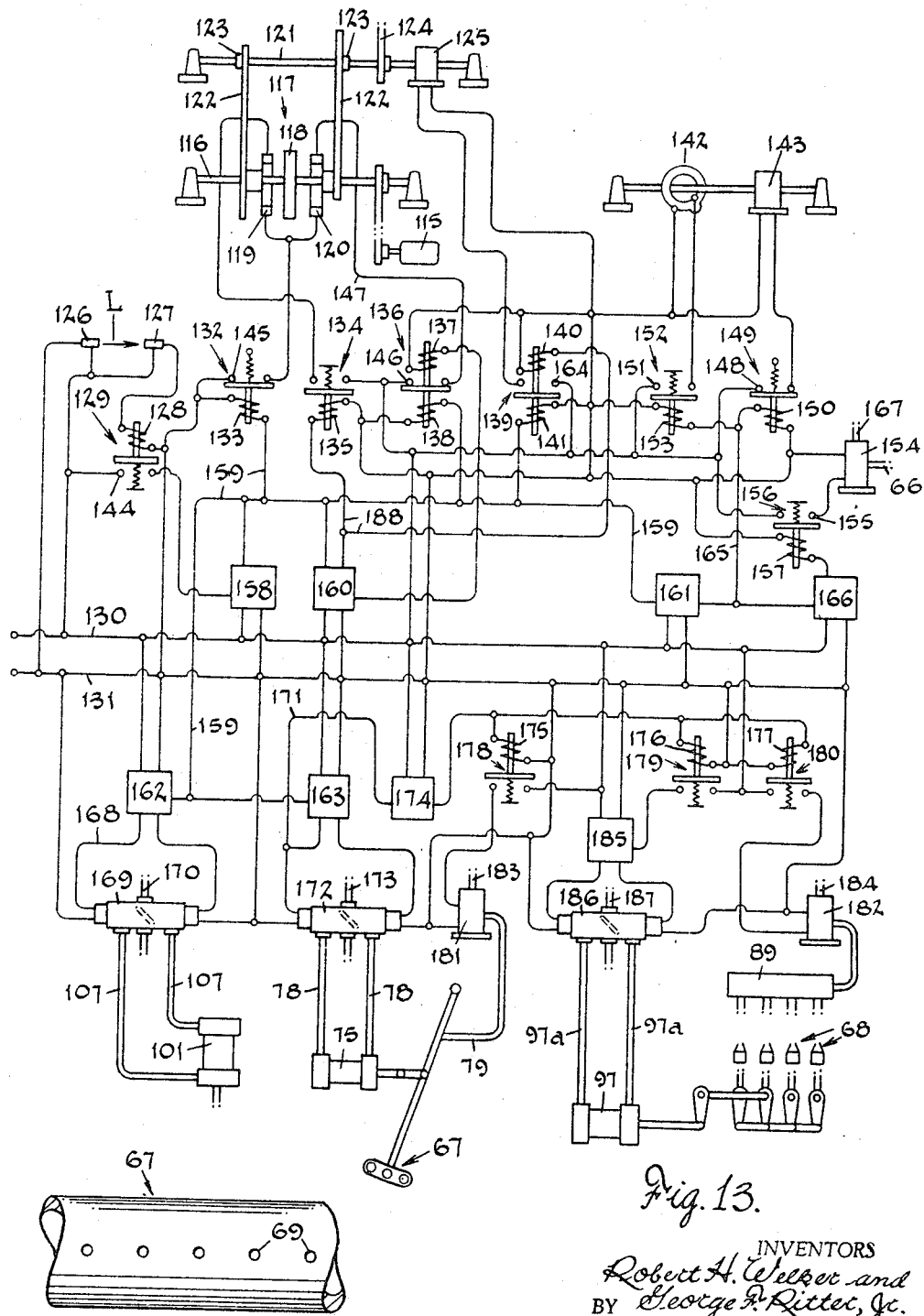
FIG. 12 is an enlarged fragmentary detailed view of one of the parts of the present invention.
FIG. 13 is a diagrammatical illustrative view of a control circuit which may be utilized for controlling the various phases of the bending operation of the apparatus shown in FIG. 1.

For this purpose the power source P is a variable speed transmission unit and, as shown diagrammatically in connection with the control circuit, FIG. 13, may include a motor 115 coupled to a first or input shaft 116 of a magnetic clutch 117, with the shaft being held in position to rotate about a fixed axis. A driving member or armature 118 is fixed to the shaft 116 intermediate its ends to rotate therewith and be selectively engageable by either of two driven members 119 and 120. The driven members 119 and 120 are coupled to a second or output shaft 121 journaled to rotate about a fixed axis parallel to the axis of the shaft 116 and, the respective driven or magnetic members are connected to the second shaft through suitable belts 122 entrained about pulleys 123 connected to the respective shafts. The shaft 121 is in turn connected to the conveyor rolls 27 by a belt 124.

As is well known, by proper selection of the size of the pulleys the second shaft may be rotated at either of two speeds dependent upon which of the driven members is engaged by the driving member of the clutch. Furthermore, when the clutch is entirely disengaged rotation of the second shaft is terminated and the rotation may be rapidly halted with the aid of a magnetic brake 125 associated with the shaft 121 to be activated when the clutch is entirely disengaged.

Preferably all phases of each bending sequence or cycle for each of the respective sheets are automatically controlled for suitable electrical circuitry, such as the control circuit shown in FIG. 13. For this purpose, a light source 126 is located at the entrance end of the bending area to produce a restricted beam of light L passing across the path of the moving sheets, which beam is received by a photoelectric cell 127. The photoelectrical cell is in turn connected to a solenoid 128 of a normally open relay switch 129 which controls the beginning of each bending cycle.

The circuit for controlling a bending cycle includes a power supply from an electrical source through supply lines 130 and 131 which are connected to the various elements of the control circuit.

The transmission unit is controlled by a normally closed relay switch 132 having opposed solenoid 133, a normally open relay switch 134 having opposed solenoid 135 and relay switch 136 having opposed solenoids 137 and 138. The magnetic brake 125 is controlled by a relay switch 139 having opposed solenoids 140 and 141.

The means for intermittently raising and lowering the lower mold part may include a combined magnetic clutch 142 and brake 143, commonly referred to as a cycle dyne unit, which connects the power source 57 to the shaft 54 and controls rotation of that shaft.

Before a bending cycle is initiated, the beam of light L is impinging on the photoelectric cell 127 and the circuit through the solenoid 128 of relay switch 129 is open with contacts 144 being disengaged. Power is supplied to one side of the magnetic members 119 and 120 through the normally closed contacts 145 of relay switch 132. The contacts 146 of relay switch 136 remain engaged from a previous bending cycle thereby supplying power through the magnetic member 120 via line 147 which in turn will drive the conveyor rolls at the slower rate of speed.

The brake of the cycle dyne unit is energized through the normally closed contacts 148 of the spring biased relay switch 149 having opposed solenoid 150 while the clutch is normally disengaged by the normally open contacts 151 of the spring biased relay switch 152 having opposed solenoid 153. The stops 65 are in the raised position by having the valve 154 de-energized by the normally open contacts 155 of spring biased relay switch 156 having opposed solenoid 157 with the valve thereby supplying fluid pressure from a source (not shown) through conduit 66 to the fluid cylinders 62.

A bending cycle is initiated by having a glass sheet moving along the conveyor system momentarily interrupt the light beam L to the photoelectric cell 127 which thereby temporarily completes the circuit through solenoid 128 of relay switch 129. This will temporarily engage contacts 144 which will energize a timer 158. The timer 158 in turn will monitor a sufficient period of time to allow the sheet to move into the bending area and into engagement with the stops 65 located in the path of the moving sheets.

After this interval of time the timer 158 completes a circuit via line 159 to solenoids 133, 138 and 141 and energizes timers 160, 161, 162 and 163. The energizing of solenoid 133 will disengage contacts 145 of relay switch 132 which will open the circuit to both of the driven members 119 and 120 thereby disengaging both of said members from the armature 118. At the same time, the completion of the circuit through solenoid 141 of relay switch 139 will engage contacts 164 of relay switch 139 to complete the circuit to the magnetic brake which in turn halts rotation of the shaft 121.

The timer 161 will monitor the period of time required to disengage the clutch 117 and engage the brake 125 and thereafter will complete a circuit via line 165 to solenoids 150 and 153 of relay switches 149 and 152, respectively, which will reverse the position of the relay switches to disengage the brake and engage the clutch thereby beginning rotation of the shaft 54 through one cycle. At the same time, the timer 161 will activate the timer 166 which monitors the period of time required to disengage the brake and engage the clutch to begin raising the lower mold part. After this time interval, the timer 166 will complete the circuit through solenoid 157 of normally open relay switch 156 to complete the circuit to the electrical control valve 154 which will reverse the position of the valve and connect conduits 66 to a vent line 167 thereby allowing the stops to descend by gravity below the path of the moving sheet.

The timer 162 will monitor a period of time sufficient to allow the lower mold part to be raised in close proximity to the upper mold part and thereafter will complete the circuit via lines 168 to one side of an electrically operated control valve 169. This will reverse the position of the valve, which is normally supplying pressure to the head end of the cylinder from supply line 170, and supply fluid pressure to the lower end or rod end of the cylinder 101 to raise the upper mold part.

The timer 163 will monitor a period of time during which the lower mold part is raised above the path and in close proximity to the upper mold part and the upward movement of the upper mold part. Thereafter the circuit is completed via line 171 to one end of an electrically operated control valve 172, which is normally supplying fluid pressure to the rod end of the cylinder 75 from supply line 173, to reverse the position of the valve and supply fluid pressure to the head end of the fluid cylinder to move the tubular members 67 across the surface of the sheet. When the timer 163 times out the position of the valve 172 is again reversed to supply fluid pressure to the rod end of the cylinder 75 and return the tubular members to their original position.

The timer 163 also actuates a timer 174 via line 171 which immediately completes the circuits through solenoids 175, 176 and 177 to close the normally open relay switches 178, 179 and 180, respectively. The closing of relay switches 178 and 180 will energize the electrically operated control valves 181 and 182 to supply pressurized air from supply lines 183 and 184 to the tubular members 67 and 68 to flow through the orifices towards the surfaces of the sheets. The closing of relay switch 179 will energize a reversing mechanism 185 which will alternately energize opposite ends of the electrically operated control valve 186 to repeatedly supply fluid pressure from supply line 187 to opposite ends of fluid cylinder 97 which will oscillate the tubular members 68.

When the timer 174 times out the delay switches 178, 179 and 180 will be forced open by their respective springs to de-energize valves 181 and 182 and reversing mechanism 185. The timer 162 operates during the combined operational time of the timers 163 and 174 whereupon it times out to reverse the position of the valve 169 and supply fluid pressure to the head end of the cylinder 101 to lower the upper mold part.

The timer 160 monitors a period of time sufficient to allow the lower mold part to lift the sheet off the conveyor rolls 27 whereupon it completes a circuit via lines 188 through solenoids 135 and 140 which will release the brake and complete the circuit through the magnetic member 119 to operate the conveyor rolls 27 at the faster rate. When the timer 160 times out, the circuit will be opened through solenoid 135 and the circuit through solenoid 137 to disengage the member 119 and engage member 120 with armature 118 to operate the conveyor rolls 27 at the slower rate of speed.

OPERATION

A brief description of the bending apparatus will aid in the understanding of the invention. A heated flat glass sheet is moved between the mold parts 30 and 31 and into engagement with the transversely spaced stops 65 whereupon the conveyor rolls are stopped. The shaft 54 is rotated to raise the lower mold part and lift the sheets off the conveyor into pressing engagement between the complemental shaping surfaces 32 and 33 to bend the sheet to the desired configuration.

After the sheets are bent the upper mold part is raised and the cam follower 51 moves across the flattened portion 108 of the cam to halt the movement of the lower mold part. While the lower mold part is stationary, the tubular members, having pressurized air temporarily passed therethrough and in streams toward the sheet surface, are passed back and forth across the upper surface of the heated bent sheet to reciprocate the streams relative to the sheet. Simultaneous therewith, pressurized air is passed through the tubular members 68 to flow in streams against the lower surfaces of the sheet and the tubular members are rocked about their fixed axes to move the streams and sweep the surface of the sheet.

After the sheets have been cooled sufficiently to set the curvature in the sheet, the sheet is returned to the conveyor rolls 27 by the continued rotation of shaft 54 to return the sheet to the conveyor to be moved into and through the tempering area.

Although the upper tubular members are shown as being moved across the surface of the sheet to move the streams relative to the sheet surface, it is readily apparent that the cooling of the upper surface could be accomplished in a manner similar to the lower surface of the sheet. For example, the tubular members could be carried by a framework attached to the arms 71 to be moved into position and thereafter the tubular members could be oscillated to move the streams relative to the sheet surface.

It is to be understood that the form of the invention herewith shown and described is to be taken as an illustrative embodiment only of the same, and that various changes in the shape, size and arrangement of parts, as well as various procedural changes may be resorted to without departing from the spirit of the invention.

We claim:
1. In apparatus for heat treating glass sheets, including a bending mold comprising a pair of spaced mold parts having complemental shaping surfaces, means for moving at least one of said mold parts toward and away from the other mold part to press a heat softened glass sheet between the shaping surfaces thereof to bend said sheet to the desired curvature and to then return said mold parts to said spaced relationship, and means for cooling at least one surface of the glass sheet after bending and while said sheet is still in contact with the shaping surface of said one mold part; the improvement which consists in that said cooling means comprises a tubular member disposed adjacent said surface on the side opposite the glass-contacting area thereof and having orifices formed therein opening toward said surface; means defining a chamber affixed to said member and including end walls and side walls attached to said member on the side adjacent the shaping surface, said side walls being inclined toward one another away from said tubular member to terminate in an elongated slot, and having a plurality of openings of sufficient area for the passage of atmospheric gas therethrough formed therein adjacent the tubular member and spaced therealong; means supplying pressurized gas to said tubular member, said pressurized gas flowing through said orifices into said chamber and drawing atmospheric gas into said chamber through said openings, the resulting mixture of pressurized and aspirated gas flowing out through said slot and against the sheet supported on the mold; and means for oscillating said tubular member back and forth about its longitudinal axis.

2. Apparatus for heat treating glass sheets as defined in claim 1, in which the oscillating means for said tubular member includes means journaling the tubular member to rock about a fixed axis and driving means for swinging said tubular member back and forth about said axis.

References Cited

UNITED STATES PATENTS

| | | | |
|---|---|---|---|
| 1,971,268 | 8/1934 | Long | 65—348 X |
| 1,999,337 | 4/1935 | Meer | 65—348 |
| 3,265,484 | 8/1966 | Ritter | 65—104 |
| 2,881,565 | 4/1959 | White | 65—114 |

FOREIGN PATENTS 441,017  1/1936  Great Britain.

ARTHUR D. KELLOGG, Primary Examiner

U.S. Cl. X.R.

65—104, 106, 114, 351